Dec. 18, 1934.  J. W. ANDERSON  1,984,620
MULTIVIEW CAMERA SHUTTER
Filed June 17, 1931  2 Sheets-Sheet 1

INVENTOR
JAMES W. ANDERSON
BY
James M. Abbett
ATTORNEY

Dec. 18, 1934.    J. W. ANDERSON    1,984,620
MULTIVIEW CAMERA SHUTTER
Filed June 17, 1931    2 Sheets-Sheet 2

INVENTOR
JAMES W. ANDERSON
BY
James M. Abbott
ATTORNEY

Patented Dec. 18, 1934

1,984,620

UNITED STATES PATENT OFFICE 1,984,620

MULTIVIEW CAMERA SHUTTER

James W. Anderson, Los Angeles, Calif., assignor to Anderson Manufacturing Company, Hollywood, Calif., a corporation of California Application June 17, 1931, Serial No. 545,048

5 Claims. (Cl. 88—19.3)

This invention relates to cameras, particularly of the multiview type, and is especially concerned with an exposure shutter and operative mechanism therefor.

In the production of photographs and particularly in making portraits, it is necessary to make successive exposures, the duration of which is wholly dependent upon the skill and judgment of the photographer. It will be evident that variation of exposure period will vary the light value of the exposure, and it is the principal object of the present invention to provide a light shutter and operating mechanism therefor, the operation of which may be manually initiated, but which will continue its cycle of operation mechanically through a predetermined period without control or interruption on the part of the operator, whereby successive exposures taken either consecutively or intermittently will be of uniform light value.

The present invention contemplates the provision of a camera equipped to receive a suitable light sensitive media, such as a photographic film or plate, said camera being equipped with light shutters mechanically operated over a predetermined period of time after having been manually set in motion.

The invention is illustrated in the accompanying drawings, in which.

Figure 1:
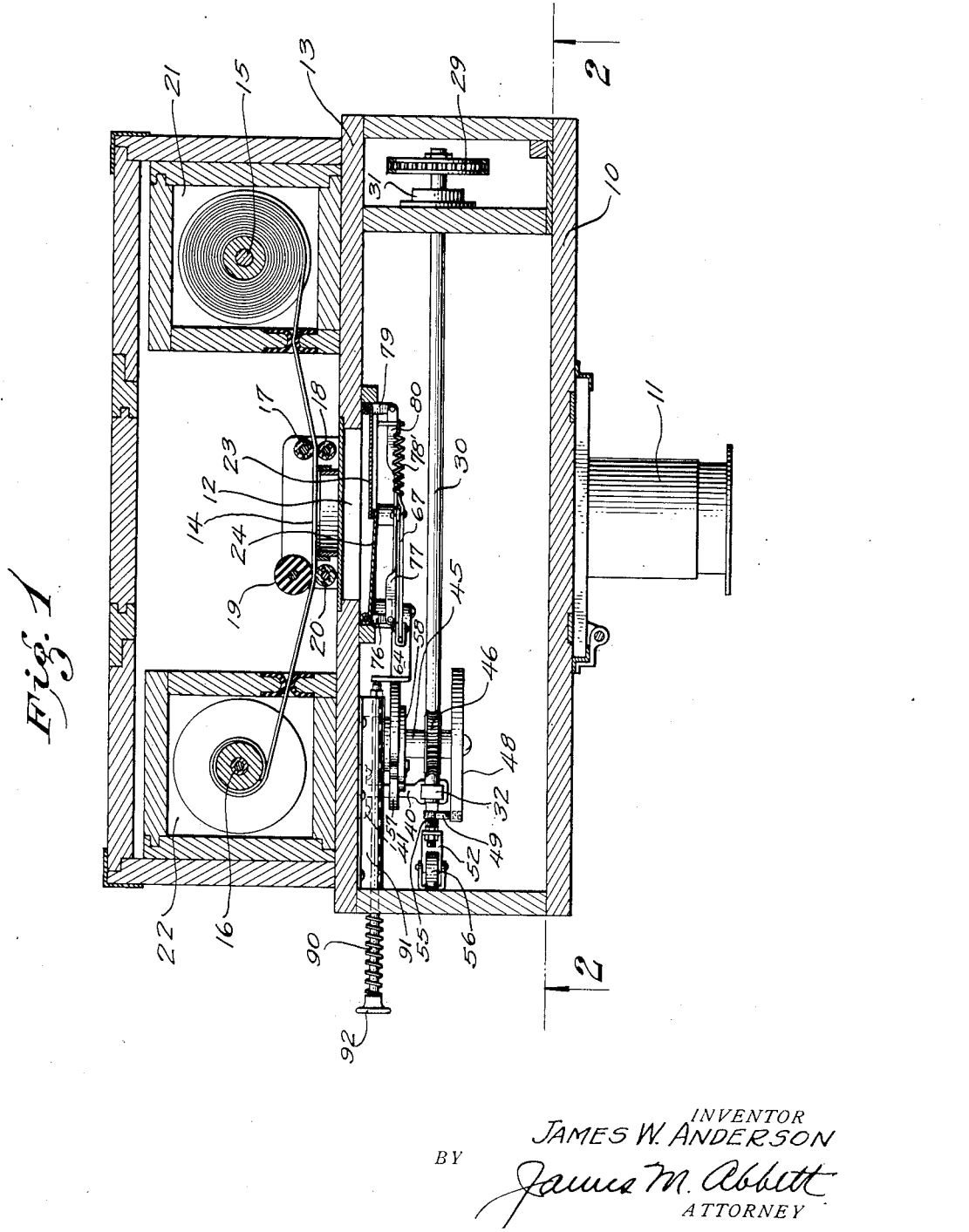
Figure 1 is a view in horizontal section showing one form of the present invention.

Referring more particularly to the drawings, 10 indicates the general housing of the camera here shown as fitted with a lens piece 11 adapted to be suitably focused so that a light beam may be projected through opening 12 in the back wall 13 of the camera. It is to be understood that a photographic plate or film 14 may be disposed across the opening 13. In Fig. 1 of the drawings, this is shown as being rolled from a roller 15 onto a roller 16 by some suitable feeding mechanism not necessary to be here shown. The film is guided between rolls 17 and 18 at one side of the opening and rolls 19 and 20 at the opposite side. This holds a length of the film stretched across the light opening 13. The film rolls are separately housed in suitable light proof compartments 21 and 22.

The light opening 13 may be opened and closed by swinging shutters 23 and 24. The invention is particularly concerned with these shutters and their operating mechanism.

An electric motor 25 is located within the casing which, through the gearing 26, drives a pulley 27 and the belt 28 thereover. This belt drives a pulley 29 mounted on the drive shaft 30 supported in suitable bearings 31 and 32. The bearing 31 is supported on the framework and is capable of a slight rotating movement thereon, while the bearing 32 is supported on the rod 33 pivotally supported at 34 at its lower end to a lever 35 pivoted to the frame at 36. The lever 35 carries an armature 37 forming part of an electro-magnet 38 suitably mounted on a frame 39. The rod 33 is longitudinally slidable in a guide 40 which is supported by clamping members 41 and a tension spring 42 connected at one end thereof to the arm 43, which is fixedly mounted on the guide 40, tends to pull downwardly the arm 44 to which the other end of the spring is fastened, and thereby to pull down the rod 33 to which the arm 44 is fixed. The electro-magnet 38, when energized, pulls the armature 37 upwardly and thereby raises the arm 35, the rod 33, and the bearing 32, for a purpose which will appear hereinafter.

On a spindle 45 a worm wheel 46 is mounted, which is adapted to intermesh with a worm gear 47 fixed upon the shaft 30 so that when the end of the shaft 30 is raised by energizing the electro-magnet 38, the gear 47 will cause rotation of this spindle 45. On this spindle is also mounted a crank disc 48 upon which a roller 49 is mounted.

Figure 2:
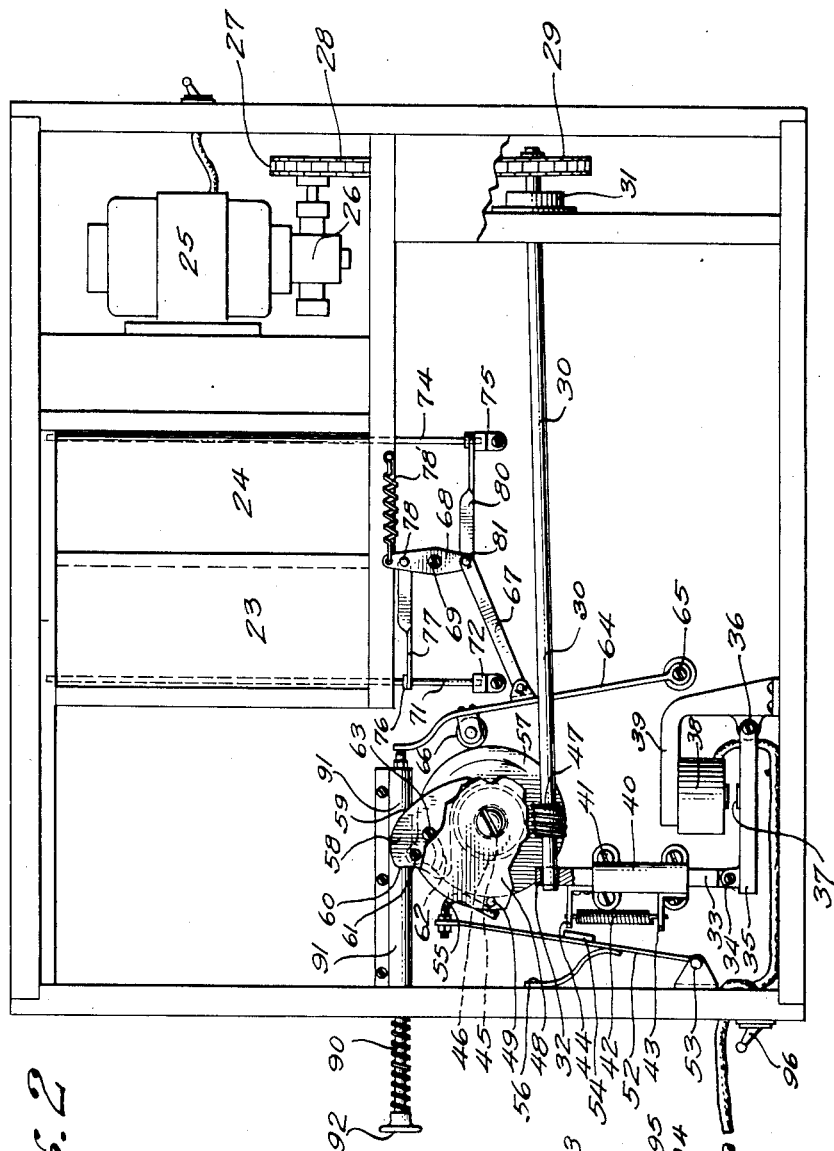
Fig. 2 is a view in vertical section through the camera as seen on the line 2—2 of Fig. 1 and more particularly showing the shutter mechanism.

An arm 52 is pivotally supported at 53 and carries a lug 54 intermediate its ends, while at the other end it carries a contact finger 55, which contacts with the roller 49. When the worm gear 47 is raised into functional relationship with the gear 46, the disc 48 will be caused to rotate in the direction of the arrow, as shown in Fig. 2, whereupon the roller 49 will move out of contact with the finger 55 and permit the arm 52 to be forced towards the shaft 45 by the effect of the spring 56, whereby the lug 54 will ride under the arm 44, which is in its raised position due to energization of the electro-magnet 38, and said lug 54 will hold the arm 44 raised after de-energization of the magnet until the disc 48 has made a complete revolution, whereupon the roller 49 will push the contact finger 55 in such manner that the arm 52 will be retracted against the action of the spring 56 so that the lug 54 will ride out from under the arm 44, which may then drop, permitting separation of the worm gear and worm pin, whereupon the driving mechanism will become inoperative even though the motor 25 and the main drive shaft 30 still continue to rotate. The worm wheel 46 and the crank disc 48 are connected together for rotation on the spindle 45, on which a cam disc 57 is also mounted and connected to the worm wheel and crank disc for rotation therewith. I provide a means to prevent reverse rotation of these parts, for example, a ratchet 42a is fixed on the spindle 45, and a pawl 42b is pivotally mounted on the crank disc 48 for rotation in one direction.

A cam member 58 having a curved surface 59 which terminates abruptly at about its widest part 60, is pivotally mounted on the disc at 61, a curved slot 62 being provided in this cam to accommodate a locking screw 63, whereby the position of the cam on the disc may be adjusted. An arm 64 is pivotally supported at 65 and carries a roller 66 which normally contacts with the periphery of the disc 57 during a part of the revolution thereof and then with the cam surface 59. A link 67 connects the arm 64 with a lever 68 pivotally mounted at 69 so that movement of the arm 64 about its pivot point 65 will cause a corresponding rocking of the lever 68.

The camera shutter comprises two flap or door members, one of which, 23, is fixed to a pivot pin 71 supported for pivotal movement in the bearing 72, while the other shutter member 24 is fixed to a pivot pin 74 supported for pivotal movement in a bearing 75. An arm 76 is fixed to the pivot 71 and to the end of this arm a link 77 is pivotally connected at one end thereof, while the other end thereof is pivotally connected to the lever 68 at the point 78. Similarly, an arm 79 is connected to the pivot 74, this being connected at the end thereof to a link 80, the other end of which is connected to the lever 68 at the point 81. With the roller 66 riding on the periphery of the disc 57, the shutters are in closed position, but on movement of the arm 64 to the right, as shown in Fig. 2, the shutters will open and on movement of the arm 64 to the left again, the shutters will close. A spring 78' acts to hold the flaps 70 and 73 of the shutter in a normally closed position. The adjustable cam 58 will thus cause operation of the shutters during the rotation of the disc 57 and the adjustment of the amount of the curved surface 59 beyond the periphery of the disc 57 will determine the relative time of opening the shutter with respect to the rotation of the disc, while the time of closing will be substantially constant with respect to such rotation, such closing taking place very suddenly as the roller 66 rides off of the cam surface 59 at the point 60 and drops back to the periphery of the disc. I prefer the type of shutter just described to a rotating disc having a slot therein, since I find that the light effect per unit of time of operation of the shutter is greater with the flap or door type of shutter.

I also provide a means for manually opening the shutters namely, a rod 90 slidable in a supporting frame 91 and operated by pushing a handle member 92, whereby the arm 64 is thrown to the right, as shown in Fig. 2.

The armature 38 is included in a circuit comprising a source of electrical energy 93, wires 94 and 95, and a switch 96. It will thus be recognized that by closing the electric circuit the magnet 38 will be energized and a cycle of operation of the shutter mechanism initiated, which operation will continue for a previously set period of time without interruption, and that furthermore, successive uniform operations may be obtained.

While I have shown the preferred form of my invention, as now known to me, it will be understood that various changes may be made in combination, construction, and arrangement of parts by those skilled in the art without departing from the spirit of my invention as claimed.

Having described my invention, what I claim and desire to secure by Letters Patent of the United States is—

1. A shutter for cameras comprising a pair of flaps hinged along opposite edges and adapted to be positioned across a camera exposure opening in a closed position normally, means for simultaneously swinging said shutters to their opened position, and releasing the shutters at their opened position to permit them to swing to a closed position, positively operated driving means out of the control of the operator during its cycle of operation for swinging the shutters to their opened position, and adjustable means for varying the interval of time required to swing the shutters to their opened position.

2. A shutter for cameras comprising, a pair of flaps forming a shutter hinged along opposite edges and normally standing in a position to close said exposure aperture, a constantly operating power unit for said shutter, means for swinging the shutters to an opened position and releasing the same, and means for placing the power unit in driving relation to said shutter swinging mechanisms at the option of the operator.

3. A shutter for cameras comprising, a pair of flaps forming a shutter hinged along opposite edges and normally standing in a position to close said exposure aperture, a constantly operating power unit for said shutters, means for swinging the shutters to an opened position and releasing the same, means for placing the power unit in driving relation to said shutter swinging mechanism at the option of the operator, and means for varying the interval of time required for opening the shutters.

4. A shutter comprising a pair of flaps hinged along their outer edges so that they may stand in overlapping relation to each other across an exposure aperture of a camera, linkage connecting the flaps whereby they will swing in unison to their opened or closed positions, yieldable means normally holding the flaps in their closed positions, a continuously operating motor, a cam adapted to open the shutters and to release them for closing, and means for optionally placing the motor in driving relation to the cam whereby the cam will rotate through its complete cycle of operation before the driving action is interrupted.

5. A shutter for cameras comprising, a pair of hinged flaps forming a shutter and normally closing the aperture, linkage connecting the two flaps whereby they will swing in unison to their opened and closed positions, yieldable means normally holding the flaps in their closed positions, a cam having a body member substantially circular in shape and being fitted with an adjustable swell thereon, shutter operating means actuated by the periphery of said cam whereby the shutters may be moved to an opened position as the cam rotates and may be suddenly released to be closed by the yieldable means, and continuously rotating driving means optionally disposed in driving relation to the cam and thus maintained beyond the control of the operator during a rotating cycle of the cam.

JAMES W. ANDERSON.